United States Patent [19]

Kunczynski

[11] 4,401,198
[45] Aug. 30, 1983

[54] FRICTION-BASED, MOTION DAMPING ASSEMBLY FOR A CHAIRLIFT OR THE LIKE

[76] Inventor: Jan K. Kunczynski, 2400 Arrowhead Dr., Carson City, Nev. 89701

[21] Appl. No.: 249,003

[22] Filed: Mar. 30, 1981

[51] Int. Cl.³ .............................................. F16F 7/10
[52] U.S. Cl. ...................... 188/379; 104/173 ST; 105/329 SC; 248/613; 248/635; 267/141.2; 384/125; 384/297; 403/147; 403/148
[58] Field of Search ............ 104/173 R, 173 ST, 180, 104/202; 105/150, 151, 329 S, 329 SC; 267/57.1 A, 63 R, 63 A, 141.1–141.3, 141.7, 153; 188/83, 379; 308/26, 238, DIG. 7; 248/613, 635; 403/146–148, 161, 162, 165; 384/125, 297

[56] References Cited

U.S. PATENT DOCUMENTS

| | | | |
|---|---|---|---|
| 2,853,325 | 9/1958 | Ward | 308/26 X |
| 3,039,831 | 6/1962 | Thomas | 308/26 |
| 3,168,874 | 2/1965 | Atanasoff | 104/89 |
| 3,257,965 | 6/1966 | Sneller | 104/173 ST |
| 3,309,153 | 3/1967 | Kelley et al. | 308/26 X |
| 3,398,700 | 8/1968 | Baker | 308/26 X |
| 4,193,612 | 3/1980 | Masser | 267/63 A X |

FOREIGN PATENT DOCUMENTS 622514 5/1949 United Kingdom ............ 308/26

*Primary Examiner*—Randolph Reese
*Attorney, Agent, or Firm*—Manfred M. Warren; Robert B. Chickering; Glen R. Grunewald

[57] ABSTRACT

A friction-based, motion damping assembly for a chairlift or the like is disclosed in which the damping assembly is mounted between a hub provided on a cable grip assembly and the chairlift hanger arm. The improved damping assembly is formed as a sleeve mounted to the hub of the cable grip with concentric rubber block members mounted around the sleeve. The hanger arm is formed with a collar having tapered surfaces, and an axially displaceable nut on the hub is used to wedge the rubber blocks into radial compressive engagement of the sleeve to generate the necessary compression of the sleeve about the hub for frictional damping.

3 Claims, 1 Drawing Figure

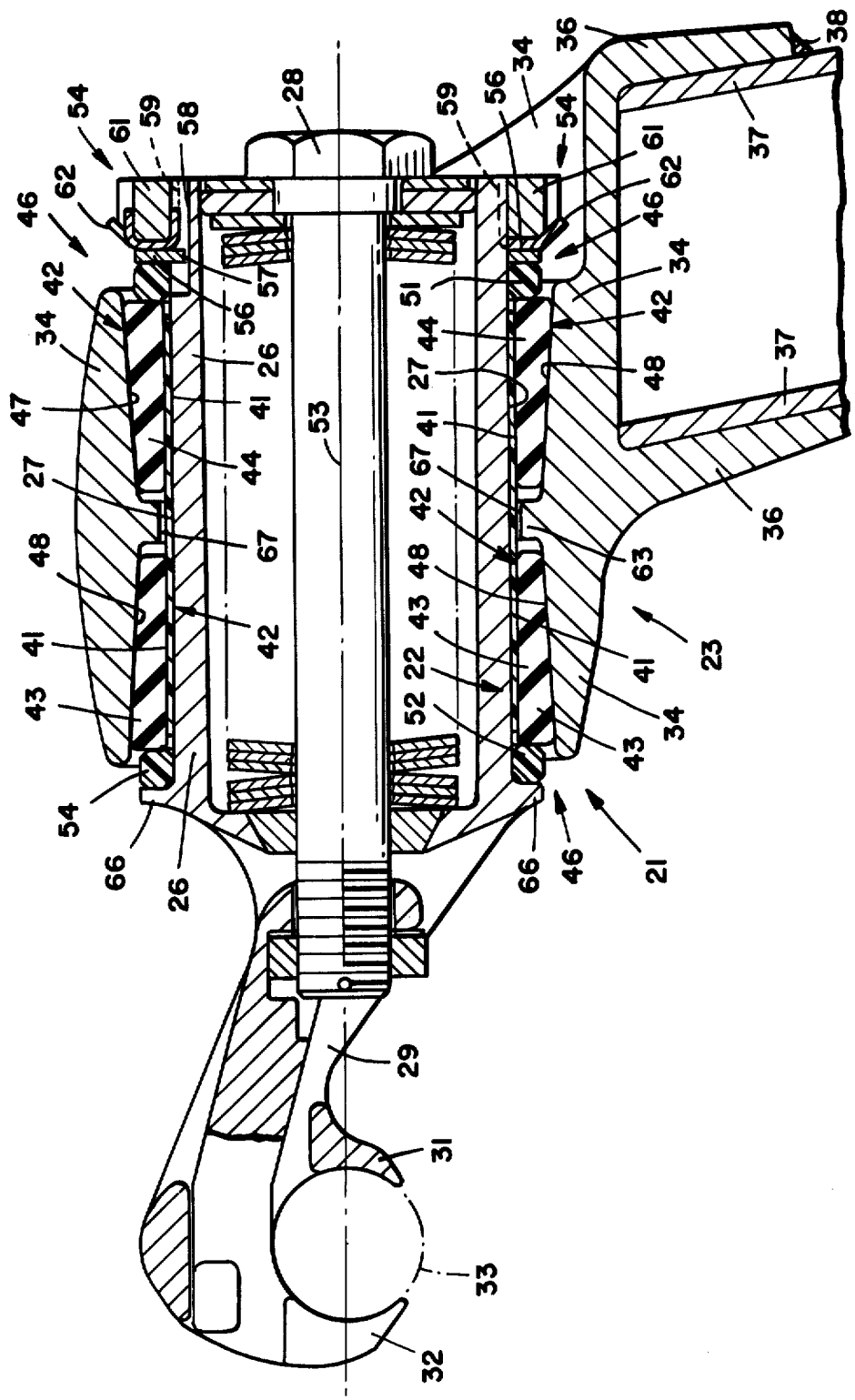

FRICTION-BASED, MOTION DAMPING ASSEMBLY FOR A CHAIRLIFT OR THE LIKE

BACKGROUND OF THE INVENTION

Chairlifts, gondolas, trams and similar personnel carrying apparatus which are widely employed at ski resorts and the like to carry skiers and sightseers up the mountainside typically are formed with a grip assembly that secures the individual chair, gondola, etc. to an endless cable and a hanger arm which is movably supported from the grip assembly and carries the weight or load. A number of different types of grips have been developed which are suitable for securing chairs to the endless cable, and similarly, a variety of weight supporting hanger arms and frames have been devised, depending upon the structure which will carry the skier up the mountainside.

Virtually all chairlift or gondola systems require that the weight supporting hanger arm be pivotally or movably mounted to the cable grip, usually by a collar which is mounted to a hub carried by the grip assembly. It is also necessary and highly desirable to damp out relative motion between the hanger arm and grip. Damping of this relative motion is necessary in order to prevent dangerous swinging of the chairs during operation of the lift.

The most common type of damping assembly for chair lifts and the like has been to provide an annular surface on the collar of the hangar arm, or on the end of the hub, against which a friction member, such as a mating annular member, can be axially urged by a spring assembly and a lock nut. A damping assembly of this type is disclosed in U.S. Pat. No. 3,257,965. Such a frictional damping assembly, therefore, is somewhat like a spring actuated disk brake operating between the collar of the hangar arm and the hub assembly of the grip so as to damp out relative motion.

While such prior friction-based, motion damping assemblies for chairlifts or the like have functioned adequately, they have inherently been found to degrade in their damping performance at an undesirably fast rate. Thus, readjustment of the friction force and replacement of the friction member have been required more frequently than would otherwise be desirable. Additionally, some friction damping devices are so inadequate as to require auxiliary equipment to insure damping. Thus, shock absorbers are commonly added to lift systems to augment damping.

OBJECTS OF THE INVENTION

Accordingly, it is an object of the present invention to provide a friction-based, motion damping assembly for a chairlift or the like which is capable of rapid frictional damping without undue wear or frequent adjustment and maintenance.

Another object of the present invention is to provide a friction-based, motion damping assembly for chairlift or the like which can be easily set to provide a desired degree of damping, is highly durable and may be installed and employed in connection with a wide variety of chairlifts, gondolas, trams, ski lifts, and the like.

Still a further object of the present invention is to provide a friction-based, motion damping assembly for chairlift or the like which is compact, inexpensive to construct and requires infrequent maintenance and inspection.

Still another object of the present invention is to provide a friction-based, motion damping assembly for chairlift or the like which is constructed in a manner permitting the generation of a wide range of damping forces to accommodate a wide range of applications.

A further object of the present invention is to provide a friction-based, motion damping assembly for chairlift or the like which provides vibrational damping between the grip assembly and the load supporting hangar arm.

Another object of the present invention is to provide a friction-based, motion damping assembly for chairlift or the like which will operate with little change in the damping force through a wide temperature range.

The friction-based, motion damping assembly of the present invention has other objects and features of advantage which will become apparent from and are set forth in more detail in the accompanying drawing and the following description of the preferred embodiment.

SUMMARY OF THE INVENTION

The friction-based, motion damping assembly for a chairlift or the like of the present invention is employed with a weight-supporting arm means which is rotatably mounted to a cable grip by means of a hub assembly. The motion damping assembly is coupled to damp relative rotational movement between the arm means and the hub assembly, and the improvement of the present invention comprises, briefly, sleeve means mounted concentrically to and in sliding frictional engagement with one of the hub assembly and the arm means, annular rubber block means mounted concentrically to and in engagement with the sleeve means and further mounted for support with respect to a remainder of the hub assembly and portion of the arm means, and load inducing means mounted in engagement with the block means and formed to induce a radial compressive load in the block means against the sleeve means to thereby cause frictional engagement and damping of the relative motion between the arm and hub.

The sleeve of the assembly is preferably a longitudinally slotted member having a low coefficient of friction, such as FEP fluorocarbon plastic that is mounted around a polished metal hub for frictional engagement therewith. The rubber block means preferably is in the form of a pair of relatively soft and resilient tapered annular rubber blocks mounted concentrically about the plastic sleeve. The arm which supports the weight of the chair may be formed with a collar having tapered surfaces that mate with the tapered blocks, and the load-inducing means includes axially displacable annular members which wedge the rubber blocks between the collar and the sleeve to induce radial compressive loading of the sleeve and frictional damping of motion between the arm and the hub.

DESCRIPTION OF THE DRAWING

The drawing is a side elevational view, in half-section, through a friction-based, motion damping assembly constructed in accordance with the present invention and mounted to a hub assembly and cable grip.

DESCRIPTION OF THE PREFERRED EMBODIMENT

Referring to the drawing, the friction-based, motion damping assembly, generally designated 21, can be seen to be mounted between a hub assembly, generally designated 22, and a weight-supporting arm means, generally designated 23, for a chairlift or the like. As used herein, the expression "chairlift" shall include chairlifts, gondolas, trams and ski lifts, and similar personnel-conveying apparatus of the type employing an endless cable and a structure to move or carry personnel up a mountainside or hill. It should be noted that the need for damping in these various personnel-carrying structures may vary considerably. In a ski lift, for example, the skier's skis remain in contact with the ground and thus provide a substantial damping effect on the arm which is mounted to the cable. Even in ski lifts, however, release of the tow bar by the skier will cause the bar and arm to swing somewhat violently, making damping of the swinging arm very necessary for the skier's safety.

Hub assembly 22 includes a hub member 26 having an outwardly facing cylindrical surface 27 upon which the motion-damping assembly 21 is mounted. The hub assembly also includes a central shaft or bolt 28 which is coupled to grip arm 29 having jaws 31 and 32 mounted thereto to grip cable 33 (shown in phantom). The details of construction of the hub assembly including the grip are not pertinent to the present invention, and it will be understood that alternate grip structures and hub assemblies may have the motion damping apparatus of the present invention mounted thereto. Similarly, weight-supporting arm means 23 can be constructed in a variety of different manners. Usually the arm means will include a collar member 34, preferably in the form of a metal casting, having a downwardly depending socket 36 into which the upper end 37 of a hanger arm can be secured, for example, by welding at 38. The lower end of the hanger arm can carry a variety of structures and may also include resilient mounting means positioned between the frame and the hanger arm, as set forth in my U.S. Pat. No. 4,179,994.

In order to provide frictional damping of the relative rotational movement between arm means 23 and hub assembly 22, the improved motion damping assembly of the present invention includes sleeve means 41 mounted concentrically to and in sliding frictional engagement with one of hub 22 and arm 23. In the form of the invention shown in the drawing, sleeve 41 is mounted in sliding frictional engagement with surface 27 of hub member 26 of the hub assembly. Concentrically mounted to and in engagement with sleeve 41 is rubber block means, generally designated 42, and shown in the drawing as a pair of annular rubber block members 43 and 44. Rubber block means 42 is further mounted for support with respect to the remainder of the hub assembly and arm, in this case, for support with respect to collar 34 of arm means 23. The assembly of the present invention further includes load-inducing means, generally designated 46, which is mounted in engagement with rubber block 42 and is formed to induce a radial compressive load in rubber block 42 against sleeve 41 and collar 34 so as to radially compress the sleeve against surface 27 of the hub for frictional engagement of the hub.

In the preferred form of the invention, sleeve 41 is provided as a separate member from rubber block means 42, although it will be understood that the sleeve could be integrally formed with or bonded to rubber block means 42. In order to produce a controlled reproducible damping force, it is preferable that sleeve 41 and surface 27 against which it bears be formed of materials which will result in a relatively low coefficient of static and sliding friction so that there will be sliding rotational movement in the damping assembly between sleeve 41 and surface 27. This can be accomplished by forming sleeve 41 of a low coefficient of friction plastic member, which preferably requires no lubrication, such as, polytetrafluoroethylene sold under the trademark TEFLON. Surface 27 can be a polished metallic surface, for example, an electro-polished stainless steel.

When sleeve and rubber block means 42 are formed as two separate members, it is preferable that the coefficient of friction between the rubber block member 42 and the sleeve be greater than the coefficient between the sleeve and surface 27 of the hub. This is readily accomplished, for example, if rubber block means 42 is formed of a rubber-like material having a durometer in the range of about 35 to about 70. The coefficient of friction between a TEFLON sleeve and such a rubber block will typically be on the order of about three times the coefficient of friction between the TEFLON sleeve and a polished metal surface.

As used herein, the expression "rubber" block means shall include both natural and synthetic rubbers and any resiliently compressive material which will react in compression in a manner similar to natural and synthetic rubbers. It will also be understood that as the durometer of the rubber increases, the friction between the rubber and sleeve will decrease, but the somewhat harder and higher durometer rubbers are suitable for use with friction damping assemblies designed to damp greater rotational torques about the hub assembly.

It is further preferable that rubber block means 42 have a coefficient of friction with collar 34 which is greater than the coefficient between the sleeve and the polished metal surface 27. This readily occurs if collar 34 is formed, for example, as a metal casting in which tapered surfaces 47 and 48 are not polished. It would also be possible to bond the two rubber blocks to the collar 34, although such construction is not necessary or preferred. In the assembly of collar, rubber blocks, sleeve and hub, the coefficient of friction between the respective members is such that the sliding friction occurs only between the inner sleeve and the hub surface 27. Such a result can also be obtained if the sleeve is formed of other common bearing materials such as bronze, other plastics and lubrication impregnated members.

As also will be apparent, it would be possible for sleeve 41 to bear and frictionally slide against a polished surface carried by collar 34, instead of hub 26.

The radial compressive load on hub surface 27 by sleeve 41 is induced by load-inducing means 46. Load-inducing means 46, in the form of the invention shown in the drawing, includes a radially inwardly tapered surface, in this case two annular surfaces 47 and 48 on collar 34, which surface is positioned to engage block means 42, and the load inducing means further includes means for urging the rubber blocks against the tapered surface in a direction which will induce the radial compressive load. In a preferred form, displacement or urging of the rubber blocks against the tapered surfaces is accomplished by annular rings members 51 and 52, which are driven along the direction of central axis 53 of the hub by load adjustment means, generally designated 54, so as to wedge the block members between the sleeve and collar and generate radial compressive loading of the sleeve against the hub.

One form of load adjustment means 54 suitable for use with the present invention is comprised of a disk 56 having a tongue portion 57 which is inserted in a keyway or notch 58 in hub member 26. The tongue 57 prevents disk 56 from rotating and permits only axial sliding of the disk along the longitudinal axis 53 of the hub. Threadably mounted on threaded end 59 of hub member 26 is a nut 61, which is held in place by lock washer 62. In order to set or adjust the radial compressive force of the sleeve against hub 26, nut 61 is screwed down on thread end 59 until ring members 51 and 52 drive the tapered rubber blocks towards central apex or divider 63 of the collar a sufficient distance to generate the desired load. It will be noted that annular member 52 bears against a circular flange 66 at the end of the hub opposite from the load adjustment means 54. Thus, the two wedge-like rubber blocks are driven to substantially the same degree into the space between the collar and sleeve. It is further preferred that the ring members 51 and 52 be formed of a low friction material, such as TEFLON, so that no rotation will be transmitted through these rings.

Since the block means of the present invention is resilient and capable of compressive loading, it is possible to form rubber blocks 43 and 44 with a substantially rectangular cross-section. It is preferable, in order to induce substantially even compressive loading of sleeve 41, that rubber block members 43 and 44 be tapered to mate with the tapered surfaces in assembly, in this case surfaces 47 and 48. Thus, the rubber block members may be advantageously each formed as annular blocks having a trapazoidal cross-section.

It is well known that while polytetrafluoroethylene plastics have a relatively low coefficient of friction, they also experience a much greater volumnmetric expansion for temperature changes than most metals. The friction-based, motion damping assembly of the present invention, however, is constructed in a manner which will accommodate expansion of sleeve 41. Thus, to the extent the sleeve expands in the thickness direction, the rubber blocks will be resiliently displaced to accommodate such expansion with the increase in compression generating an increase in frictional loading which is essentially insignificant. Additionally, the apex or divider portions 63 of the collar can have an inner surface 67 which is spaced at a sufficient distance from the sleeve to permit expansion without contact.

An additional important advantage of the friction-based, motion damping assembly of the present invention is that rubber block means 42 provides a resilient cushion that will help damp microvibrations in the cable that would otherwise be transferred through the grip and hub assembly to the hanger arm. Thus, the rubber block means not only provides the compressional loading for frictional damping of relative rotational motion, it also provides for compressive damping between the weight supporting hanger arm and the cable grip.

As will be seen from the drawing, it is preferable that sleeve 41 be formed as a relatively thin member. This minimizes the radial thermal expansion upon heating of the sleeve and also maintains the overall assembly as a relatively compact one which can pass easily around conventional bull-wheel structures. It is also preferable that the sleeve 41 be longitudinally slit or slotted so that there will be at least a pair of segments, and more if desired, that will accommodate radial compression of the sleeve without buckling. If, however, the sleeve is formed from a relatively thin fluorocarbon plastic, the slit is that which occurs as a result of fabricating the sleeve from a flat sheet of material. A solid, unslotted, cylindrical sleeve can be employed as long as the thickness and the material strength are not so great as to bridge or significantly interfer with radial compression.

An additional feature which results from use of the combination of a TEFLON sleeve and rubber block is that wear of the sleeve does not materially reduce the damping force. Wear will not cause the assembly of the present invention to loosen-up or relax. The rubber block simply maintains the pressure and displacement of the block as a result of wear is negligible.

EXAMPLE

A friction-based, motion damping assembly constructed as shown in the drawing has been tested on a three-seat chairlift structure. The compressive loading was set so that hanger arm oscillation would be terminated after two to three swings when the chair was in the unloaded condition and 7 to 8 times when loaded. It will be understood that an important feature of the present assembly is that it can be adjusted rapidly to other levels of damping, for example, one oscillation or 15 oscillations when unloaded. Rubber blocks members 43 and 44 were formed of a rubber having a durometer of 40, and the hub diameter on the hub assembly was approximately three inches. Once the assembly was set and locked in place, the hanger arm was cycled 2,000,000 times through an angle of about 30 degrees to the vertical by a testing machine. After such testing the reduction in frictional damping of the assembly of the present invention due to wear was found to be essentially negligible, and wear on the TEFLON sleeve was also negligible.

What is claimed is:

1. An adjustable, low-wear, friction-based, rotational motion damping assembly for a chairlift or the like having a weight supporting arm means freely depending from and rotatably mounted to a hub assembly, said motion damping assembly being coupled to damp relative rotational movement between said arm means and said hub assembly and including sleeve means mounted concentrically to and in sliding frictional engagement with a surface on one of said hub assembly and a portion of said arm means and said sleeve means and said surface are formed for a low coefficient of sliding friction therebetween; annular rubber block means mounted concentrically to and in engagement with said sleeve means and being further mounted for support with respect to a remainder of said hub assembly and said portion of said arm means; and adjustable load inducing means mounted in engagement with said bock means and formed to induce a radial compressive load in said block means against said sleeve means and against said remainder of said hub assembly and said portion of said arm means which is sufficiently high to be effective in damping the rotational movement of the freely depending arm means within a relatively small number of arm swings, wherein the improvement in said motion damping assembly comprises:

said portion of said arm means is provided as a collar and said load inducing means includes a radially inwardly tapered, smooth surface on said collar and means for urging said block means against said tapered, smooth surface in a direction inducing said radial compressive load, said block means being tapered to mate with said tapered, smooth surface.

2. An adjustable, low-wear, friction-based, rotational motion damping assembly for a chairlift or the like having a weight supporting arm means freely depending from and rotatably mounted to a hub assembly, said motion damping assembly being coupled to damp relative rotational movement between said arm means and said hub assembly and including sleeve means mounted concentrically to and in sliding frictional engagement with a surface on one of said hub assembly and a portion of said arm means and said sleeve means and said surface are formed for a low coefficient of sliding friction therebetween; annular rubber block means mounted concentrically to and in engagement with said sleeve means and being further mounted for support with respect to a remainder of said hub assembly and said portion of said arm means; and adjustable load inducing means mounted in engagement with said block means and formed to induce a radial compressive load in said block means against said sleeve means and against said remainder of said hub assembly and said portion of said arm means which is sufficiently high to be effective in damping the rotational movement of the freely depending arm means within a relatively small number of arm swings, wherein the improvement in said motion damping assembly comprises:

said hub assembly is formed with a polished metal surface;

said sleeve means has a thin cross-section, is mounted in engagement with said metal surface, is longitudinally slotted, and is formed from a fluorocarbon plastic;

said block means is formed from a rubber-like material having a durometer in the range of about 35 to about 70; and said load inducing means is provided by a gradually radially inwardly tapered smooth surface on said portion of said arm means and by a member mounted in engagement with said block means and mounted for axial displacement in a direction wedging said block means between said sleeve means and said tapered smooth surface to induce said radial compressive load.

3. An adjustable, low-near, friction-based, rotational motion damping assembly for a chairlift or the like having a weight supporting arm means freely depending from and rotatably mounted to a hub assembly, said motion damping assembly being coupled to damp relative rotational movement between said arm means and said hub assembly and including sleeve means mounted concentrically to and in sliding frictional engagement with a surface on one of said hub assembly and a portion of said arm means and said sleeve means and said surface are formed for a low coefficient of sliding friction therebetween; annular rubber block means mounted concentrically to and in engagement with said sleeve means and being further mounted for support with respect to a remainder of said hub assembly and said portion of said arm means; and adjustable load inducing means mounted in engagement with said block means and formed to induce a radial compressive load in said block means against said sleeve means and against said remainder of said hub assembly and said portion of said arm means which is sufficiently high to be effective in damping the rotational movement of the freely depending arm means within a relatively small number of arm swings, wherein the improvement in said motion damping assembly comprises:

said portion of said arm means is formed as a collar mounted concentrically of and in engagement with said block means, said collar is formed with a pair of inwardly tapered, smooth surfaces which meet in an apex portion proximate the center of said collar, said block means is provided by a pair of annular blocks which are tapered to correspond and matingly engage said smooth surfaces, and said load inducing means includes a ring member formed of a low coefficient of sliding friction material mounted in engagement with one of said blocks for urging said annular blocks toward said apex portion to induce said radial compressive load.

* * * * *